United States Patent
Lechner

(10) Patent No.: US 10,620,452 B2
(45) Date of Patent: Apr. 14, 2020

(54) HOLDER FOR LENSES AND HELMET FOR SUCH A HOLDER

(71) Applicant: Stefan Lechner, Leonding (AT)

(72) Inventor: Stefan Lechner, Leonding (AT)

(*) Notice: Subject to any disclaimer, the term of this patent is extended or adjusted under 35 U.S.C. 154(b) by 181 days.

(21) Appl. No.: 15/947,128

(22) Filed: Apr. 6, 2018

(65) Prior Publication Data

US 2018/0292671 A1  Oct. 11, 2018

(30) Foreign Application Priority Data

Apr. 6, 2017 (AT) .................................. 50287/2017

(51) Int. Cl.
  *G02C 3/02* (2006.01)
  *A42B 3/18* (2006.01)
  *A42B 1/24* (2006.01)

(52) U.S. Cl.
  CPC ................ *G02C 3/02* (2013.01); *A42B 1/247* (2013.01); *A42B 3/185* (2013.01); *G02C 2200/02* (2013.01)

(58) Field of Classification Search
  None
  See application file for complete search history.

(56) References Cited

U.S. PATENT DOCUMENTS

| 2005/0052613 A1* | 3/2005 | Kidouchim | G02C 9/00 351/47 |
| 2007/0033775 A1* | 2/2007 | Hsiao | A42B 1/247 24/303 |
| 2007/0050888 A1* | 3/2007 | Huang | A42B 1/247 2/171 |
| 2007/0118972 A1* | 5/2007 | Fang | A42B 1/247 2/209.13 |

FOREIGN PATENT DOCUMENTS

| CH | 708683 A2 | 4/2015 |
| DE | 202015007127 U1 | 1/2016 |
| KR | 20120116062 A | 10/2012 |
| WO | 2006001628 A1 | 1/2006 |
| WO | 2008013373 A2 | 1/2008 |

* cited by examiner

Primary Examiner — Ricky L Mack
Assistant Examiner — Gary W O'Neill

(57) ABSTRACT

A holder for eyeglass lenses having a holding part, which is magnetically secured to the fastening part in detachable fashion and has a nose bridge for holding eyeglass lenses, and having at least one swivel bearing, which is provided between the fastening part and the nose bridge of the holding part and has at least two bearing parts that are able to swivel relative to each other around the swivel axis of the swivel bearing in order to move the holding part between a use position of the eyeglass lenses and a non-use position of the eyeglass lenses in which they are folded upward in relation to the use position. In order to embody a holder of the above-mentioned type in a reliable and simply designed way, the first bearing parts and second bearing parts are embodied so that they are detachable from each other and are held together magnetically, for which purpose, at least one bearing part has at least one permanent magnet with a magnetization direction oriented in the direction of the swivel axis.

15 Claims, 3 Drawing Sheets

HOLDER FOR LENSES AND HELMET FOR SUCH A HOLDER

FIELD OF THE INVENTION

The invention relates to a bolder for eyeglass lenses having a fastening part for attaching to a head covering having a holding part, which is magnetically secured to the fastening part in detachable fashion and has a nose bridge for holding eyeglass lenses, and having at least one swivel bearing, which is provided between the fastening part and the nose bridge of the holding part and has at least two bearing parts that are able to swivel relative to each other around the swivel axis of the swivel bearing in order to move the holding part between a use position of the eyeglass lenses and a non-use position of the eyeglass lenses in which they are folded upward in relation to the use position.

BACKGROUND OF THE INVENTION

A holder for eyeglass lenses that can be fastened to a helmet is known from the prior art (KR 2012 0116062 A). This holder is essentially composed of a fastening part securely attached to the helmet and a holding part for the eyeglass lenses. The holding part and fastening part stick together magnetically so as to permit the eyeglass lenses and the holding part to be easily detached from the helmet. This holder also offers the possibility of swiveling the holding part relative to the fastening part from a use position into an upward-folded position for which purpose the holder has a swivel bearing. Since such a swiveling of the holding part always exerts forces/moments on the magnetic connection between the holding part and the fastening part, a disadvantageous detachment of the holding part from the fastening part must be expected—in order to prevent this, such holders have a comparatively complex design.

The object of the invention is therefore to simplify the design of a holder for eyeglass lenses of the type mentioned at the beginning without negatively affecting the durability or ease of use of the holder.

SUMMARY OF THE INVENTION

The invention attains the stated object in that the first bearing parts and second bearing parts are embodied so that they are detachable from each other and are held together magnetically, for which purpose at least one bearing part has at least one permanent magnet with a magnetization direction oriented in the direction of the swivel axis.

If the first and second bearing parts are embodied so that they are detachable from each other and stick together magnetically, for which purpose at least one bearing part has at least one permanent magnet with a magnetization direction oriented in the direction of the swivel axis, then this can not only simplify the design of the holding part, but can also free the magnetic holder of swiveling-induced leverage forces, thus making it possible to rule out the occurrence of an unwanted detachment of the magnetic connection when the holding part is swiveled as part of its function. It is thus possible to achieve a particularly stable holder. This simplified design according to the invention, however, does not entail the expectation of a negative effect on use because the holder can be separated relatively easily by overcoming the magnetic forces at the swivel bearing.

In addition, because it is divided up among magnetically attached bearing parts, the swivel bearing can be more robustly protected from soiling and wear—which can extend the longevity and functionality of the holder e.g. even in the presence of adverse environmental influences.

The orientation of the magnetization direction of the permanent magnets of the bearing parts in the same direction as the swivel axis can ensure a particularly reliable connection between the fastening part and holding part. In addition, a reliable, smooth swiveling ability of the swivel bearing can be assured.

The holder according to the invention can therefore combine durability and ease of use with structural simplicity and can thus stand out significantly from the prior art.

A particularly reliable and stable holder can also be achieved if at least one first bearing part is provided between two second bearing parts and is able to swivel around the swivel axis relative to the second bearing parts. The fact that the second bearing parts embrace the first bearing part makes it possible to prevent the holding part from being pulled off by a transverse or oblique load. In addition, by providing two bearing parts on the holding part, it is possible to significantly increase the holding force. This makes it possible to enable a defined removal or detachment of the holding part from the fastening pan in the vertical (downward) direction.

The above-mentioned advantages can be improved further if two first bearing parts are provided between two second bearing parts and stick to each other magnetically.

If the first bearing part is provided on the fastening part and if the second bearing parts are provided on the holding part, then it is possible to achieve a holder with a particularly simple design.

If each bearing part has at least one permanent magnet, then it is possible to ensure a particularly reliable and powerful magnetic holding force of the holding parts to one another. It is thus possible to further increase the reliability of the holder.

If the permanent magnet is an axially magnetized ring magnet and the holding part or fastening part protrudes into its annular gap, it is thus possible to achieve a high degree of centering precision between the holding parts in a simply designed way. The high degree of centering precision also enables the eyeglass lenses to be guided so that they are parallel to the eyes of the wearer. The holder according to the invention can thus reliably counteract production-related tolerances.

If the fastening part has a plurality of first bearing parts positioned one behind another and the bearing part on the holding part can be fastened to any one of them in order to form the swivel bearing, then it is possible to produce a holder that can be adapted to the needs of the wearer in a particularly flexible, easy way. The alternative holding positions of the bearing parts allows the spacing of the eyeglass lenses to be advantageously adapted to the needs of the wearer. In addition, the magnetically detachable connection between the holding part and fastening part makes it possible to easily switch holding positions by repositioning—and thus ensures ease of use of the holder.

The risk of injury can be reduced and safety of the device can be improved if a first bearing part on the fastening part functions as a stop for the swivel bearing that is formed between the other first bearing part on the fastening part and the bearing part on the holding part. The stop can reliably prevent the eyeglass lenses from tilting toward the wearer's eyes—making it possible to prevent injuries, for example due to impacts with the eyeglass lenses or due to wind pressure.

The holder cart also be embodied with a simpler design if the holding part is embodied as H-shaped and transitions into the nose bridge.

If the fastening part is composed of a plurality of parts and has a plate-shaped spacer with a variable thickness, then the eyeglass lenses can be vertically adjusted on the holder in a particularly simply designed way. Particularly by selecting a suitable thickness of the spacer, the eyeglass lenses can be centered in front of the wearer's eyes in order to achieve the best visibility conditions.

The individual adjustability of the holder can be increased if the fastening part is composed of a plurality of parts and has a guide between a first and second part of the fastening part, with the guidance path of the guide extending parallel to the swivel axis. Thus, for example, the swivel bearing can also be subsequently moved horizontally after the fastening part has been fastened to the helmet, thus adjusting the position of the nose bridge. This also makes the holder easier to use.

The adjustment of the swivel position can be facilitated if a plurality of adjusting catches is provided between the fastening part and the nose bridge.

The holder according to the invention can be particularly well-suited for use with a helmet, in particular a motorcycle helmet. This is particularly true, for example, with regard to a resilient, solid connection of the fastening part to a head covering.

If the fastening part of the holder is fastened to the inner lining of the helmet inside the outer shell, then the small size of the holder can make it possible to provide an unlimited field of view through the eyeglass lenses of the holder. This can also ensure a stable attachment of the holder to the helmet.

BRIEF DESCRIPTION OF THE DRAWINGS

An example of the subject of the invention is shown in greater detail in the figures by means of an embodiment variant. In the drawings.

DETAILED DESCRIPTION OF THE PREFERRED EMBODIMENTS

Figure 1:
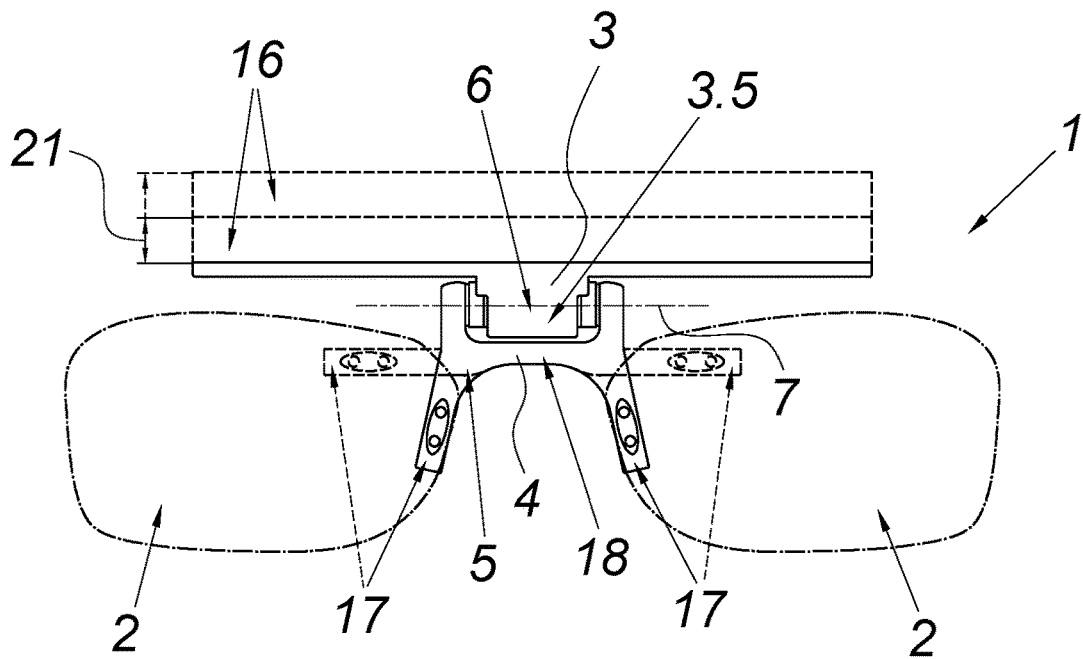
FIG. 1 shows a front view of the holder, with the holding part being secured to the fastening part.
Figure 2:
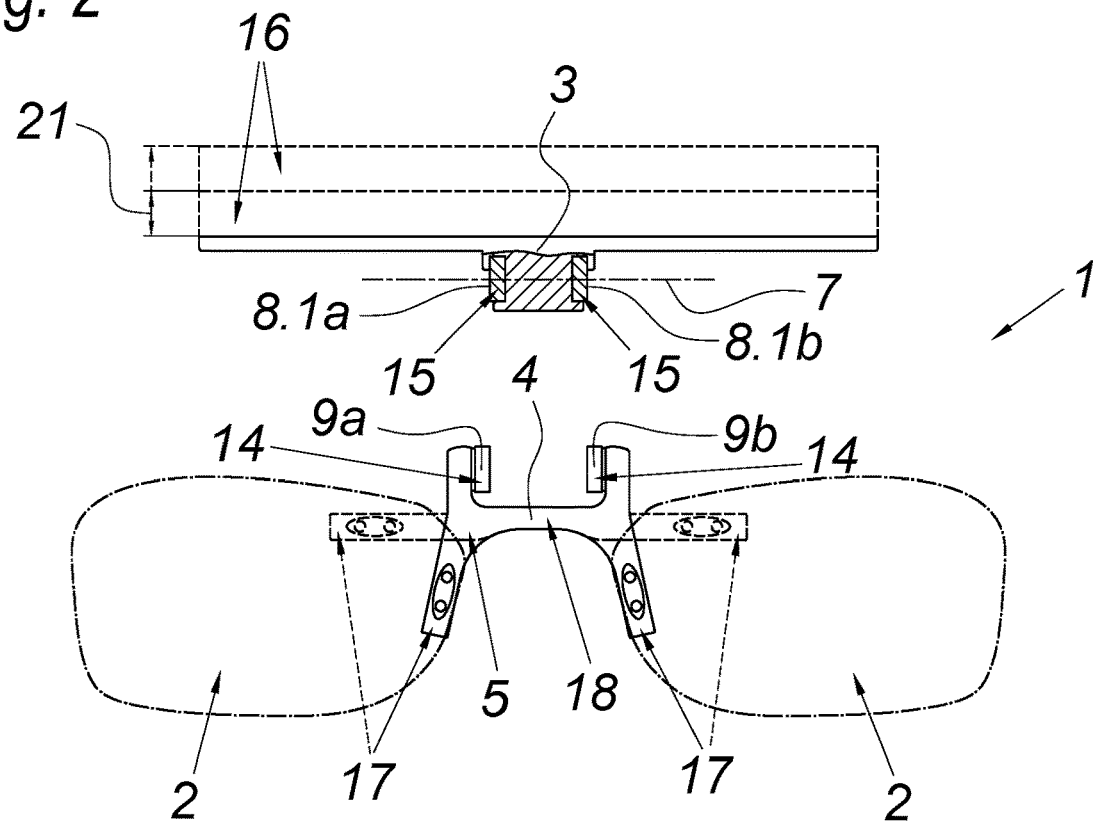
FIG. 2 shows a partially cut-away front view of the holder in FIG. 1 with the holding part and fastening part separated from each other.

FIGS. 1 and 2 show a holder 1 for eyeglass lenses 2 in which the holder 1 has a fastening part 3 for attaching the holder 1 to a bead covering, in particular a helmet—but the latter is not shown in the figures. The holder 1 also has a holding part 4, which is magnetically secured to the fastening part 3 in a detachable way.

FIG. 1 shows an example of a holder 1 in which the holding part 4 is magnetically secured to the fastening part 3. FIG. 2, however, shows a holding part 4 that is detached from the fastening part.

The holding part 4 in turn has a nose bridge 5 to which the eyeglass lenses 2 are fastened. The nose bridge 5 in this case is embodied so that if at all possible, it does not touch the wearer's nose. Specifically, the holder 1 makes it possible to avoid the nose bridge 5 having to be supported on the wearer's nose—and as a result, no pressure points are produced on the wearer's nose. The nose bridge 5 in this case is divided into two assembly segments 17 and a connecting segment 18 that connects the assembly segments 17, with the eyeglass lenses being fastened to the assembly segments 17 of the nose bridge 5. To this end, the holding part 4 is preferably embodied as H-shaped and transitions into the nose bridge 5. In this case, the assembly segments 17 are oriented vertically downward relative to the connecting segment 18. This is particularly visible in FIGS. 1 and 2. Alternatively, however, the assembly segments 17 can also be positioned in the horizontal extension of the connecting segment 18, as indicated by the assembly segments 17 depicted with dashed lines in FIG. 1 and 2.

Between the holding part 4 and fastening part 3, a swivel bearing 6 with a swivel axis 7 is provided in order to be able to swivel the holding part 4 around the swivel axis 7 relative to the fastening part 3. To this end, the swivel bearing 6 has a plurality of bearing parts 8.*a*, 8.*b*, 8.2*a*, 8.2*b*, 9*a*, 9*b* so that the holding part 4 can be moved around the swivel axis 7 relative to the fastening part 3, from a use position 10 of the eyeglass lenses 2 into a non-use position 11 of the eyeglass lenses 2 that is folded upward relative to the use position 10. The use position 10 of the eyeglass lenses 2 is shown, for example, in FIGS. 3 and 5. The non-use position 11 of the eyeglass lenses 2 is shown in FIG. 4.

Figure 3:
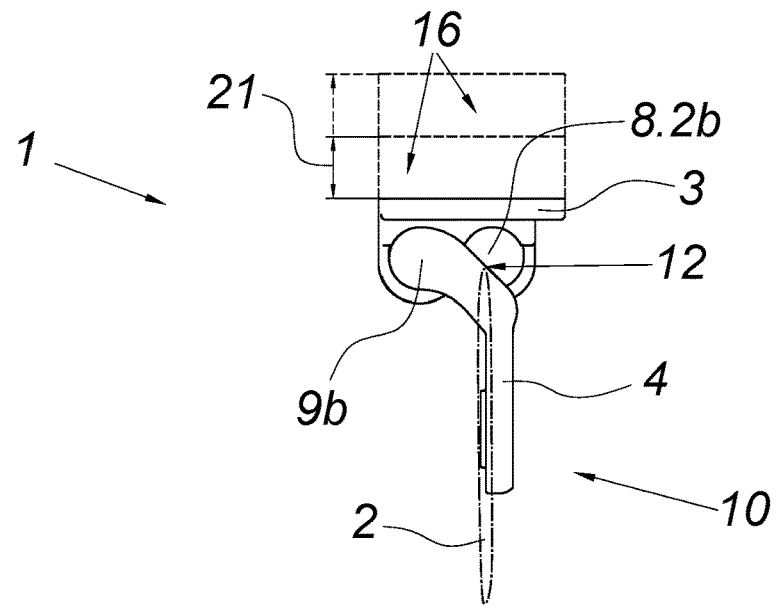
FIG. 3 shows a side view of a holder in the use position.
Figure 4:
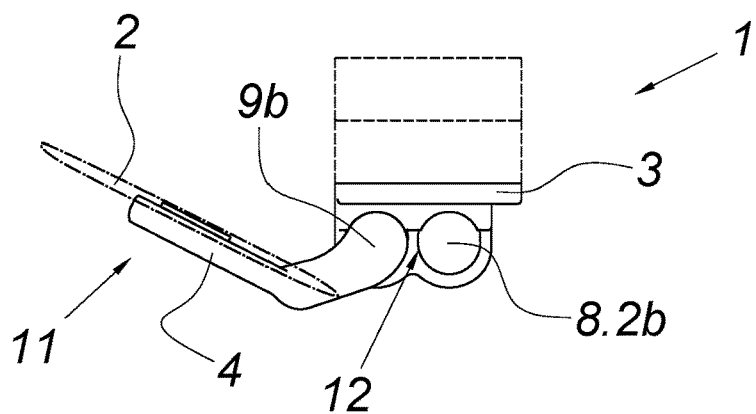
FIG. 4 shows a side view of a holder in the folded-up position.

In this case, a first bearing part—8.1*a*, 8.1*b* according to FIG. 2 and 8.2*a*, 8.2*b* according to FIG. 3—on the fastening part 3 magnetically cooperates with a second bearing part 9*a*, 9*b* on the holding part 4 in order to secure the holding part 4 to the fastening part 3 in a magnetically detachable fashion. The first bearing part 8.2*a* is positioned analogously to the first bearing part 8.2*b* and the first bearing part 8.1*a* is positioned analogously to the first bearing part 8.1*b* on opposite sides of the fastening part 3. This produces a mechanism that is particularly easy to use. To this end, the first bearing parts 8.1*a*, 8.1*b*, 8.2*a*, 8.2*b* of the swivel bearing 6 are provided on a projection 3.5 of the fastening part 3. This can increase the swiveling ability between the fastening part 3 and the holding part 4. For example, the holding part 4 embraces this projection 3.5.

Figure 6:
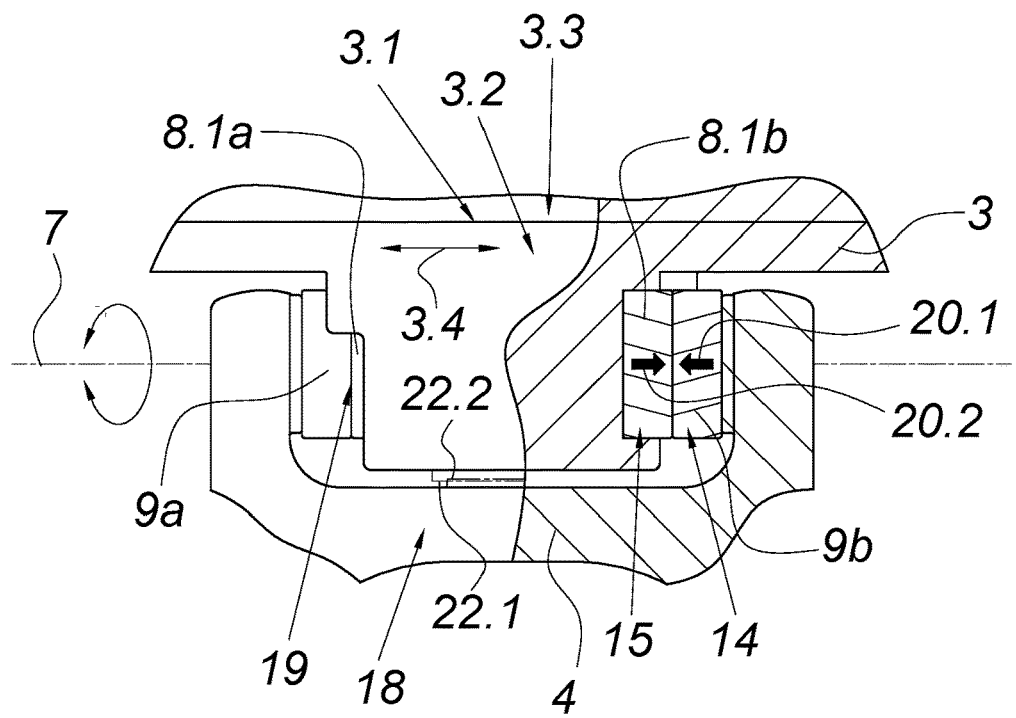
FIG. 6 shows a partially cut-away detail view of the swivel bearing.

In addition, the bearing 6 is embodied with a comparatively simple design—and by means of the bearing parts 8.1*a*, 8.1*b*, 8.2*a*, 8.2*b*, 9*a*, 9*b* that can be magnetically detached from one another, can perform both a holding function and a bearing function simultaneously. To that end, at least one bearing part 8.1*a*, 8.1*b*, 8.2*a*, 8.2*b*, 9*a*, 9*b* has a permanent magnet 14 whose magnetization direction 20.1, 20.2 coincides with the direction of the swivel axis 7, which is shown in FIG. 6. The holder 1 produced in this way features simplicity of design, ease of use, and high reliability.

As shown in FIGS. 1 and 2 and particularly as shown in the detail from FIG. 6, the swivel bearing 6 has at least a plurality of bearing parts 8.1*a*, 8.*b*, 8.2*a*, 8.2*b*, 9*a*, 9*b*, two second bearing, parts 9*a*, 9*b* of which are provided on the holding part 4. A plurality of first bearing parts 8.1*a*, 8.1*b*, 8.2*a*, 8.2*b* are provided on the fastening part 3, positioned between the second bearing parts 9*a*, 9*b* when the holding part 4 is secured to the fastening part 3—as shown in FIG.

1. The first bearing part 8.1*a*, 8.1*b*, 8.2*a*, 8.2*b* in this case can be swiveled around the swivel axis 7 relative to the second bearing parts 9*a*, 9*b*.

According to one embodiment, two first bearing parts 8.1*a*, 8.1*b* and 8.2*a*, 8.2*b*, are provided on the fastening part 3 and two second bearing parts 9*a*, 9*b* are provided on the holding part 4; the first bearing parts 8.1*a*, 8.1*b*, 8.2*a*, 8.2*b* are rigidly connected to one another and the second bearing parts 9*a*, 9*b* are rigidly connected to one another. As shown in FIGS. 1 and 2, the two bearing parts 9*a*, 9*b* provided on the holding part 4 embrace the first bearing parts 8.1*a*, 8.1*b*, 8.2*a*, 8.2*b* on the fastening part 3 and the bearing parts 8.1*a*, 8.1*b*, 8.2*a*, 8.2*b*, 9*a*, 9*b* always cooperate in pairs (8.1*a* with 9*a* and 8.1*b* with 9*b* or 8.2*a* with 9*a* and 8.2*b* with 9*b*). To this end, preferably all of the bearing parts 8.1*a*, 8.1*b*, 8.2*a*, 8.2*b*, 9*a*, 9*b* have permanent magnets 14, 15, with the permanent magnets 15 of the bearing parts 8.1*a*, 8.1*b*, 8.2*a*, 8.2*b* interacting in a magnetically reciprocal fashion with the respective permanent magnets 14 of the bearing parts 9*a*, 9*b*, i.e. having mirror-inverted magnetization directions 20.1, 20.2. The permanent magnets 14 and 15 preferably also form between themselves the sliding surfaces 19 of the bearing parts 8.1*a*, 8.1*b*, 8.2*a*, 8.2*b*, 9*a*, 9*b*.

In another embodiment, which is not shown in detail in the figures, however, the permanent magnets 14, 15 are embodied as axially magnetized ring magnets. It is thus possible to achieve a simple centering of the permanent magnets 14, 15 in the bearing parts 8.1*a*, 8.1*b*, 8.2*a*, 8.2*b*, 9*a*, 9*b* in that the holding part 4 or the fastening part 3 respectively protrudes into the annular gap of the ring magnet.

Figure 5:
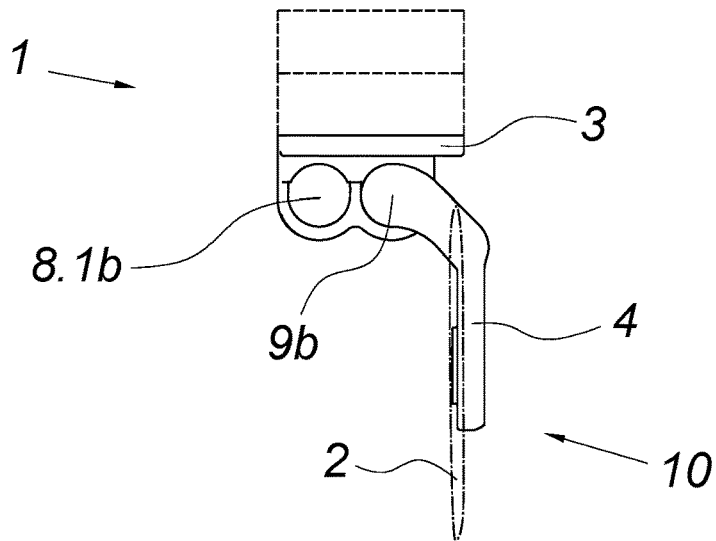
FIG. 5 shows a side view of a holder in the use position, with the bearing parts of the holding part engaging other bearing parts on the fastening part.

As is particularly shown in FIGS. 3 through 5, the fastening part 3 has a plurality of—preferably two—first bearing parts 8.1*a*, 8.1*b* and 8.2*a*, 8.2*b* positioned one behind the other. The second bearing part 9*a*, 9*b* on the holding part 4 can thus be selectively brought into engagement with the first bearing part 8.1*a*, 8.1*b* or the other first bearing part 8.2*a* 8.2*b* and can cooperate with it in order to form the swivel bearing 6. The two second bearing parts 9*a* and 9*b* on the holding part 4 thus selectively cooperate with the two first bearing parts 8.1*a* and 8.1*b* or the two first bearing parts 8.2*a* and 8.2*b*. This enables a flexible positioning of the eyeglass lenses 2 on the holder 1.

In addition, a first bearing part 8.2*a*, 8.2*b* on the fastening part 3 functions as a stop 12 for the swivel bearing 6. The stop 12 on the first bearing part 8.2*a*, 8.2*b* in this case is formed when a connection is produced between the other first bearing part 8.1*a*, 8.1*b* on the fastening part 3 and the bearing part 9*a*, 9*b* on the holding part 4. This can be inferred, for example, from FIG. 3. In this case, the connecting segment 18 of the nose bridge 5 strikes against the stop 12 of the first bearing part 8.2*a*, 8.2*b*. The connecting segment 18 extends in an essentially straight line on the nose bridge 5 and thus offers a stable stopping point for the holding part 4. It is thus possible to prevent pressure on the eyeglass lenses 2 particularly due to headwind from causing the holding part to tilt in the direction of the wearer's eyes. To this end, the stop 12 keeps the eyeglass lenses 2 in a vertical orientation when in the use position 10. It is thus still possible for them to be folded away into the folded-up position 11.

In order to ensure a particularly high adjustability of the holder 1, the fastening part 3 is composed of a plurality of parts, as is particularly visible in FIGS. 1-5. The fastening part 3 has a plate-shaped spacer 16 with a variable thickness 21 in order to be able to thus variably change the height of the eyeglass lenses 2 in relation to the wearer's eyes.

Figure 7:
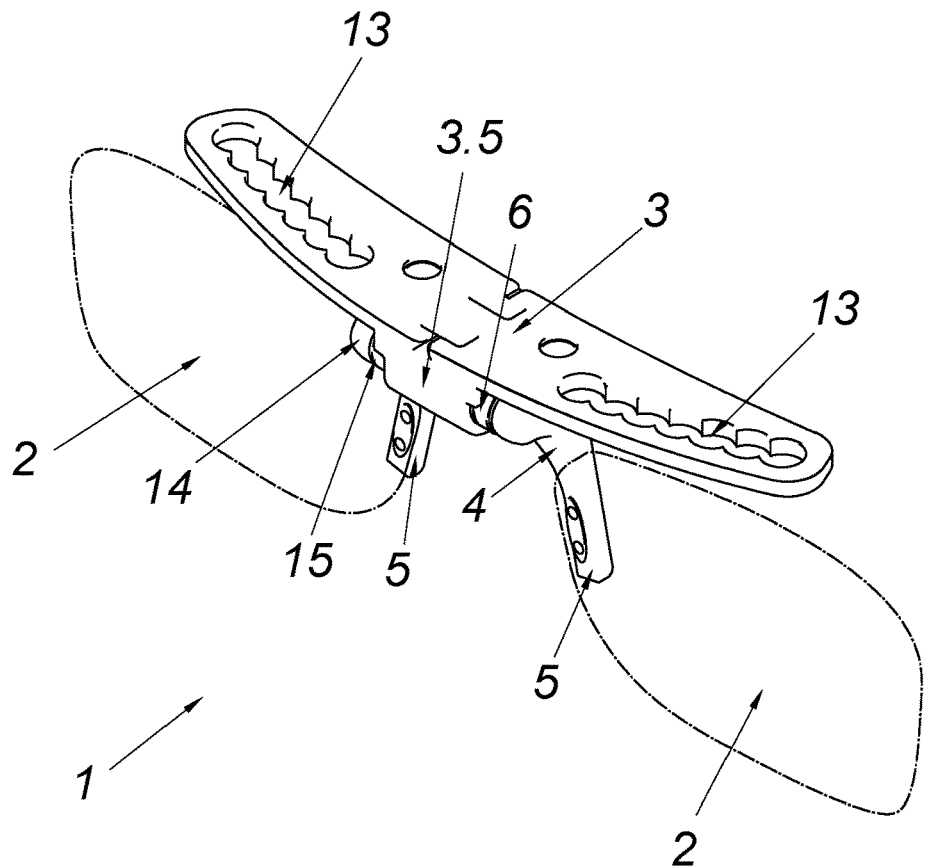
FIG. 7 shows an isometric view of the holding part according to the invention.

The holder 1 is preferably fastened to a head covering, in particular a helmet. In this case, the fastening part 3 is fastened to the inner lining inside the outer shell of the helmet. In this case in particular, the fastening part 3 abuts a lower end of the inner lining and is fastened to it by means of fasteners (rivets, screws, nails, bolts, etc.). This is not shown in the figures, though. The fastening openings 13 in the especially embodied fastening part 3 for the flexible adjustment and fastening to the helmet are shown in FIG. 7.

As can be further inferred in FIG. 6, when the fastening part 3 is composed of a plurality of parts, a guide 3.1 is provided between a first and second part 3.2, 3.3 of the fastening pan 3. This guide 3.1 has a linear guidance path 3.4 extending parallel to the swivel axis 7. It is thus possible to move the swivel bearing and thus also the nose bridge 5 after the holder 1 has been mounted, thus always ensuring a high degree of wearing convenience.

FIG. 6 also indicates that between the fastening part 3 and the nose bridge 5, a plurality of for example slightly overlapping adjusting catches 22.1, 22.2 is provided. It is thus possible to easily set different swivel positions between the fastening part 3 and the holding part 4 and also to fix a set swivel position.

The invention claimed is:

1. A holder for eyeglass lenses comprising:
   a fastening part for attaching to a head covering;
   a holding part, which is magnetically secured to the fastening part in detachable fashion and has a nose bridge for holding eyeglass lenses; and
   at least one swivel bearing, which is provided between the fastening part and the nose bridge of the holding part and has at least two bearing parts that are able to swivel relative to each other around a swivel axis of the swivel bearing in order to move the holding part between a use position of the eyeglass lenses and a non-use position of the eyeglass lenses in which the eyeglass lenses are folded upward in relation to the use position, wherein first bearing parts and second bearing parts are detachable from each other and are held together magnetically, for which purpose, at least one bearing part has at least one permanent magnet with a magnetization direction oriented in a direction of the swivel axis.

2. The holder according to claim 1, wherein the at least one first bearing part is provided between two second bearing parts and is able to swivel around the swivel axis relative to the second bearing parts.

3. The holder according to claim 2, wherein two first bearing parts are provided between two second bearing parts and the first and second bearing parts stick to each other magnetically.

4. The holder according to claim 2, wherein the at least one first bearing part is provided on the fastening part and the second bearing parts are provided on the holding part.

5. The holder according to claim 1, wherein each bearing part has at least one permanent magnet.

6. The holder according to claim 1, wherein the at least one permanent magnet is an axially magnetized ring magnet and the holding part or the fastening part protrudes into an annular gap of the permanent magnet.

7. The holder according to claim 1, wherein the fastening part has a plurality of first bearing parts positioned one behind another and the second bearing part on the holding part can be fastened to any one of the first bearing parts in order to form the swivel bearing.

8. The holder according to claim 7, wherein a first bearing part on the fastening part functions as a stop for the swivel bearing that is formed between the other first bearing part on the fastening part and the second bearing part on the holding part.

9. The holder according to claim 1, wherein the holding part is embodied as H-shaped and transitions into the nose bridge.

10. The holder according to claim 1, wherein the fastening part is composed of a plurality of parts and has a plate-shaped spacer with a variable thickness.

11. The holder according to claim 1, wherein the fastening part is composed of a plurality of parts and has a guide between a first and second part of the fastening part, with the guidance path of the guide extending parallel to the swivel axis.

12. The holder according to claim 1, wherein a plurality of adjusting catches is provided between the fastening part and the nose bridge.

13. A helmet with a holder according to claim 1.

14. The helmet according to claim 13, wherein the helmet is a motorcycle helmet.

15. The helmet according to claim 13, with an outer shell and an inner lining positioned inside the outer shell, wherein the fastening part of the holder is fastened to the inner lining inside the outer shell.

* * * * *